United States Patent
Porinsky et al.

(10) Patent No.: US 7,703,347 B2
(45) Date of Patent: Apr. 27, 2010

(54) TRANSMISSION FOR MOTORIZED TRACK SYSTEM

(75) Inventors: Lucas P. Porinsky, Dexter, MI (US); William R. Tighe, Dearborn, MI (US); William M. Huffman, Jackson, MI (US)

(73) Assignee: Johnson Controls Technology Company, Holland, MI (US)

( * ) Notice: Subject to any disclaimer, the term of this patent is extended or adjusted under 35 U.S.C. 154(b) by 24 days.

(21) Appl. No.: 11/969,236

(22) Filed: Jan. 4, 2008

(65) Prior Publication Data

US 2008/0163708 A1 Jul. 10, 2008

Related U.S. Application Data

(60) Provisional application No. 60/878,712, filed on Jan. 4, 2007.

(51) Int. Cl.
*F16H 55/18* (2006.01)

(52) U.S. Cl. .............................. 74/441; 74/440; 74/425; 74/89.42

(58) Field of Classification Search .................... 74/425, 74/411, 410, 409, 440, 89.42
See application file for complete search history.

(56) References Cited

U.S. PATENT DOCUMENTS

| | | | |
|---|---|---|---|
| 4,947,969 A | 8/1990 | Tarlton, Sr. | |
| 5,145,427 A | 9/1992 | Kawai et al. | |
| 5,415,256 A | 5/1995 | Weigand et al. | |
| 5,769,652 A | 6/1998 | Wider | |
| 5,773,947 A | 6/1998 | Torii et al. | |
| 5,808,250 A | 9/1998 | Torii et al. | |
| 5,907,199 A | 5/1999 | Miller | |
| 5,909,866 A | 6/1999 | Vaidyanathan et al. | |
| 7,051,986 B1 | 5/2006 | Taubmann et al. | |
| 2002/0014132 A1* | 2/2002 | Sueshige et al. | 74/425 |
| 2004/0069085 A1 | 4/2004 | Nakamura et al. | |
| 2004/0206195 A1 | 10/2004 | Landskron et al. | |
| 2005/0097699 A1* | 5/2005 | Yagi et al. | 15/250.3 |
| 2006/0170266 A1 | 8/2006 | Landskron et al. | |
| 2008/0041178 A1* | 2/2008 | Ozsoylu et al. | 74/425 |
| 2008/0156132 A1* | 7/2008 | Pachov | 74/425 |

* cited by examiner

*Primary Examiner*—David M Fenstermacher
(74) *Attorney, Agent, or Firm*—Dickinson Wright PLLC

(57) ABSTRACT

A track system (18) of the type used to adjust the position a supported element such as vehicular seat (12) includes a pair of base rails (20) that slidably interact with a respective pair of driven rails (22). A transverse rail (24) is attached to each of the driven rails (22) so that the driven rails (22) slide together as a unit. A motor (34) is supported on the transverse rail (24) and includes a pair of drive shafts (36) emanating from either end. The drive shafts (36) carry on their distal ends' respective worm gears (38) which are contained within a transmission assembly (26). The worm gears (38) mesh with external teeth on respective drive nuts (54) which interact with a lead screw (28) that can be oriented to either remain stationary relative to the base rails (20) or can be rotatably fixed within the driven rails (22). The drive nut (54) is prevented from causing objectionable noise and premature wear in operation by the inclusion of one or two compressible washers (66).

20 Claims, 6 Drawing Sheets

TRANSMISSION FOR MOTORIZED TRACK SYSTEM

CROSS REFERENCE TO RELATED APPLICATIONS

This Application claims priority to U.S. Provisional Application No. 60/878,712 filed Jan. 4, 2007.

BACKGROUND OF THE INVENTION

1. Field of the Invention

This invention relates generally to a motorized track system, and more particularly toward a transmission for a motorized track system of the type used in position adjustors for vehicular seats, windows and the like.

2. Related Art

Vehicle seat assemblies are often provided with a motorized track system that enable the position of the seat assembly within a motor vehicle to be adjusted in the forward and rearward directions. Similarly, vehicular window assemblies may include a motorized track system of similar construction to enable the position of the window to be adjusted in up and down directions. In each case, the supported element is guided by the motorized track system for back and forth movement to change its position, as desired.

In the case of vehicular seat assemblies, for example, such adjustment capability is desired to enable vehicle operators of various body dimensions to be seated comfortably within the motor vehicle. In these systems, an electric motor may be coupled to a lead screw positioned within a sliding track assembly. In such an arrangement, the lead screw may be fixed or may rotate but a drive nut interacts with the lead screw through motor-driven rotation to move the vehicle seat assembly forward or rearward. A motorized window regulator assembly may work in much the same manner.

A transmission is generally provided in these types of motorized track systems for transferring power from the motor to the drive nut. In configurations where a pair of sliding tracks are employed, the electric motor may be mounted on a transverse beam bridging each of the tracks, for example in the center of the tracks or at one end of the tracks. Because certain components within the transmission rotate while others are held generally stationary, vibrations may be produced within the transmission when the transmission is operational, thereby causing noise. Another cause of noise is lateral movement of the components within the transmission housing.

Various proposals have been advanced for addressing the noise issues in a transmission for a motorized track system. For example, U.S. Pat. No. 7,051,986 to Taubmann et. al., granted May 30, 2006, discloses a system wherein a shim disk, identified as item number 96', is used to compensate for axial play. Shim disks are subject to manufacturing variances, however and may not consistently address the noise issues. Accordingly, there is a need for a motorized track system for use in vehicular applications that meets or exceeds the established strength, speed and noise requirements. There is also a need to provide a reliable transmission that includes shock absorbing components to reduce the vibration between those components in the transmission, and to reduce noise and to eliminate lateral movement of certain components. There is a further need to provide a reliable, acceptable motorized track system for providing translational adjustment, which avoids one or more of the above-noted problems.

SUMMARY OF THE INVENTION

The invention overcomes the disadvantages and shortcomings of the prior art by providing a transmission assembly for a motorized track system of the type used to adjust the position of a support element such as a vehicular seat, window or the like. The assembly comprises an externally threaded lead screw establishing a longitudinal direction along which a supported element is moved back and forth to change its longitudinal position. A drive nut is operatively engaged with the lead screw. Motor-driven rotation of the drive nut causes the supported element to be longitudinally displaceable along the lead screw. A housing generally surrounds the drive nut. The housing includes a mounting bracket for attaching to the supported element so as to translate the supported element together with the drive nut longitudinally along the lead screw. A compressible washer is disposed between the drive nut and the housing. The compressible washer exerts a bias between the drive nut and the housing so as to eliminate lateral movement of the drive nut within the housing and to dampen or otherwise eliminate noise producing vibrations from the transmission.

According to another aspect of the subject invention, a motorized track system is provided of the type used to adjust the position of a supported element such as vehicular seat, window or the like. The track system comprises a base track, and an externally threaded lead screw. The lead screw establishes a longitudinal direction along which a supported element is moved back and forth to change its longitudinal position. A driven track is interactive with the base track for longitudinal sliding movement there between. A drive nut is operatively engaged with the lead screw. A housing is fixedly connected to the driven track and generally surrounds the drive nut. The housing includes a mounting bracket for attaching to the supported element to translate the supported element together with the drive nut and the driven track longitudinally along the lead screw. A compressible washer is disposed between the drive nut and the housing.

According to a further embodiment of the invention, a method is provided for eliminating play between a drive nut mounted in a transmission for use in a motorized track system having a lead screw, the transmission including a housing and a worm gear. The method comprises the steps of locating first and second bushings on opposite sides of the drive nut, placing a wave washer between at least one of the first and second bushings and the drive nut, and capturing the drive nut, worm gear, first and second bushings, and wave washer in a housing so that the wave washer is partially compressed. The wave washer provides an axial biasing force that reduces the tendency for the drive nut to vibrate longitudinally relative to the first and second bushings which might otherwise produce noise.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
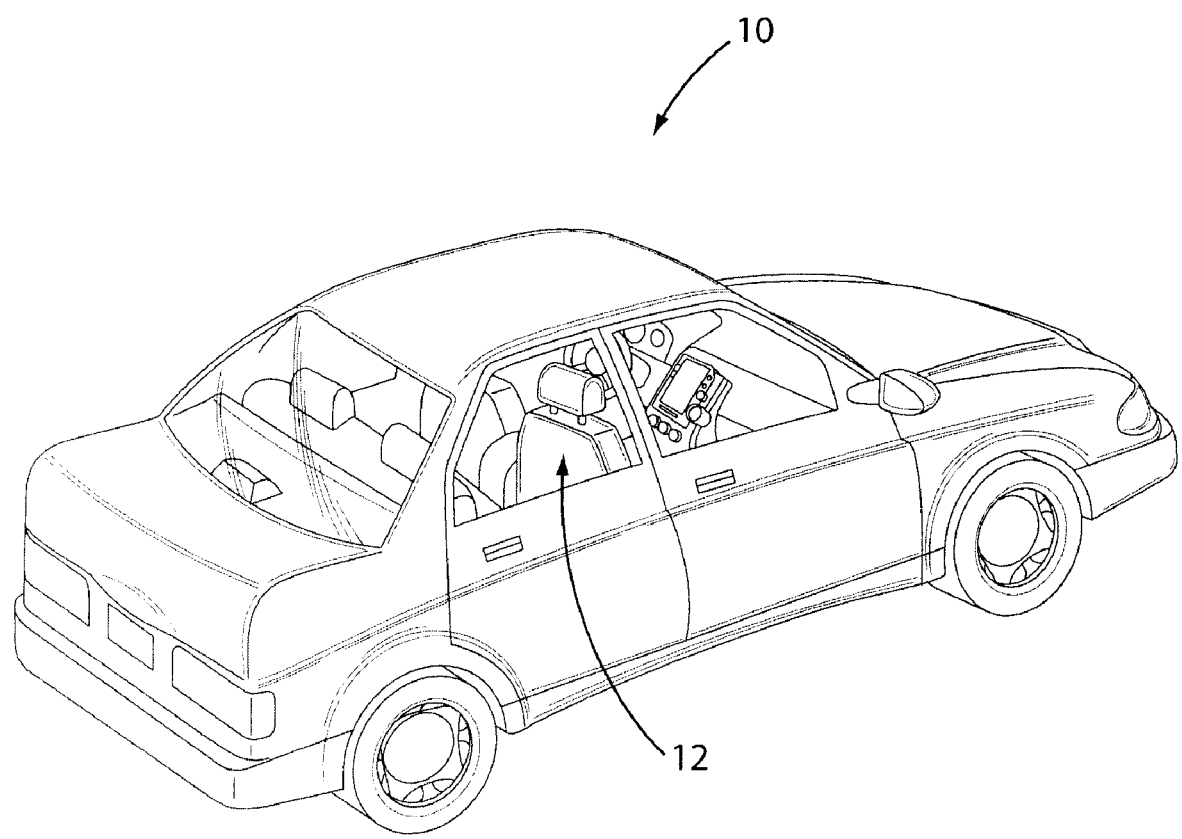
FIG. 1 is a simplified perspective view of an exemplary automobile.
Figure 2:
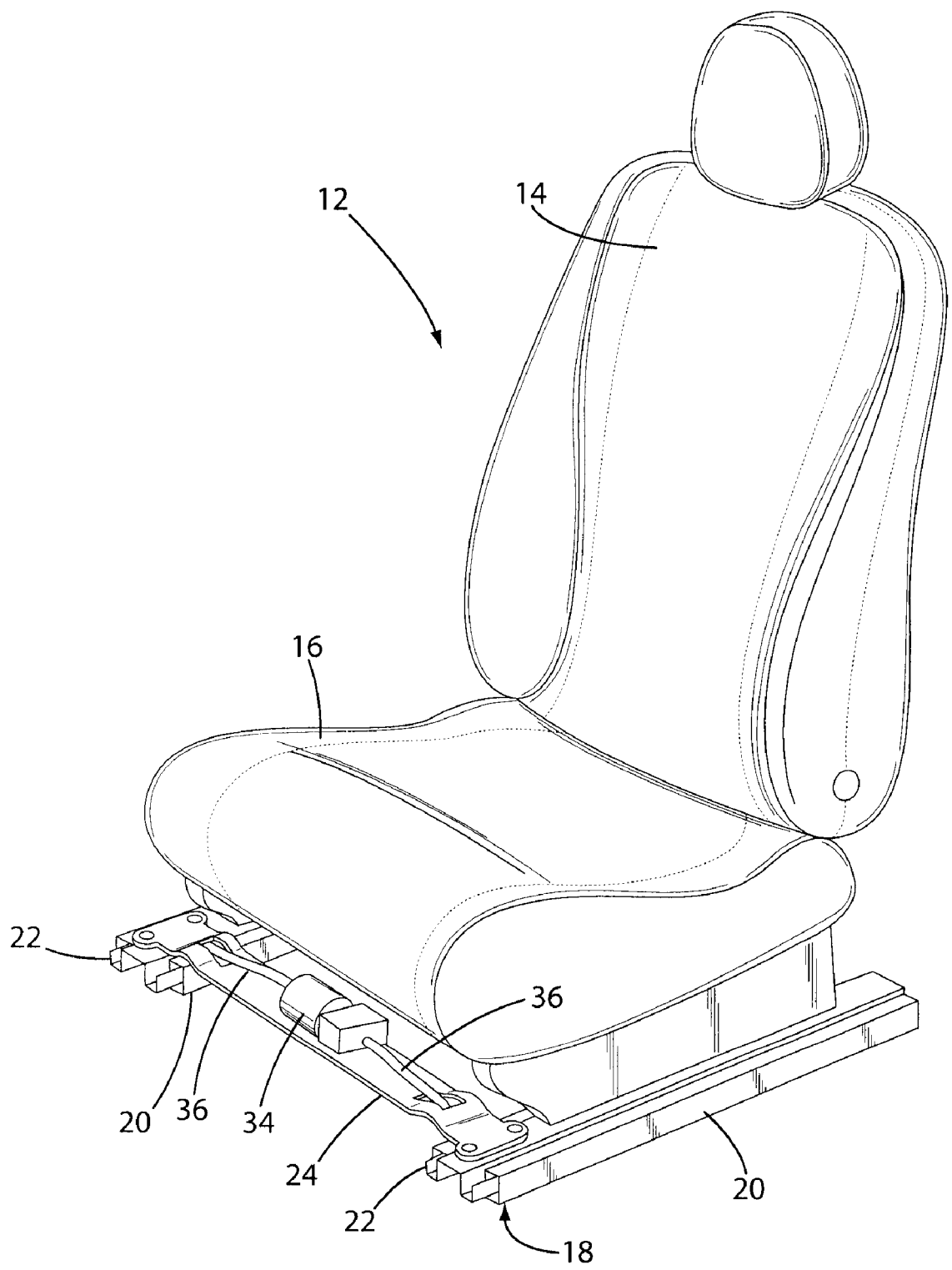
FIG. 2 is a perspective view of vehicular seat including a motorized track system according to the subject invention.

Referring to the Figures, wherein like numerals indicate like or corresponding parts throughout the several views, an exemplary motor vehicle is generally shown at 10 in FIG. 1. The vehicle 10 in FIG. 1 is merely exemplary, and may instead take the form of a light duty truck, SUV, minivan, bus, train, airplane, boat, or any other such vehicle or stationary application in which a motorized track assembly may be employed. In this specific example, however, the vehicle 10 is depicted including a passenger seat 12 having the customary back rest 14 and seat cushion 16, as illustrated in FIG. 2. The seat 12 is supported above a motorized track system, generally indicated at 18, that is configured to allow an occupant to adjust the position of the seat 12 in longitudinally forward and rearward directions relative to the vehicle 10. Although the following description of the subject invention is carried out by reference to vehicular seating application, it will be understood by those of skill in the art that the subject track system 18 is adaptable for other uses, including window regulator systems, and other applications which include a supporting element which is moved back and forth under the influence of a motor to change its longitudinal position.

Referring to FIGS. 2-5, the track system 18 is shown in greater detail including two track sets that are generally parallel to one another. Each track set includes a base rail 20 that is coupled to a structure such as the floor of the vehicular passenger compartment. An upper, driven rail 22 is coupled to the seat 12 and is slidably interconnected to the base rail 20 so that the two can slide relative to one and other in a fore and aft direction, in the case of the vehicular seating application. In the case of a window regulator application, the driven rail 22 would be oriented so as to slide up and down relative to the base rail 20. Those of skill in the art will envision other applications and orientations for the track system 18. A bridge-like transverse rail 24 interconnects the driven rails 22 from each track set so that they are coupled together and move in unison when the seat 12 is adjusted forward or rearward.

A transmission assembly, generally indicated at 26, is operatively disposed between the base 20 and driven 22 rails so as to forcibly displace one rail relative to the other during position adjustment of the supported element—be that a vehicular seat 12, a window, or other component.

Figure 5:
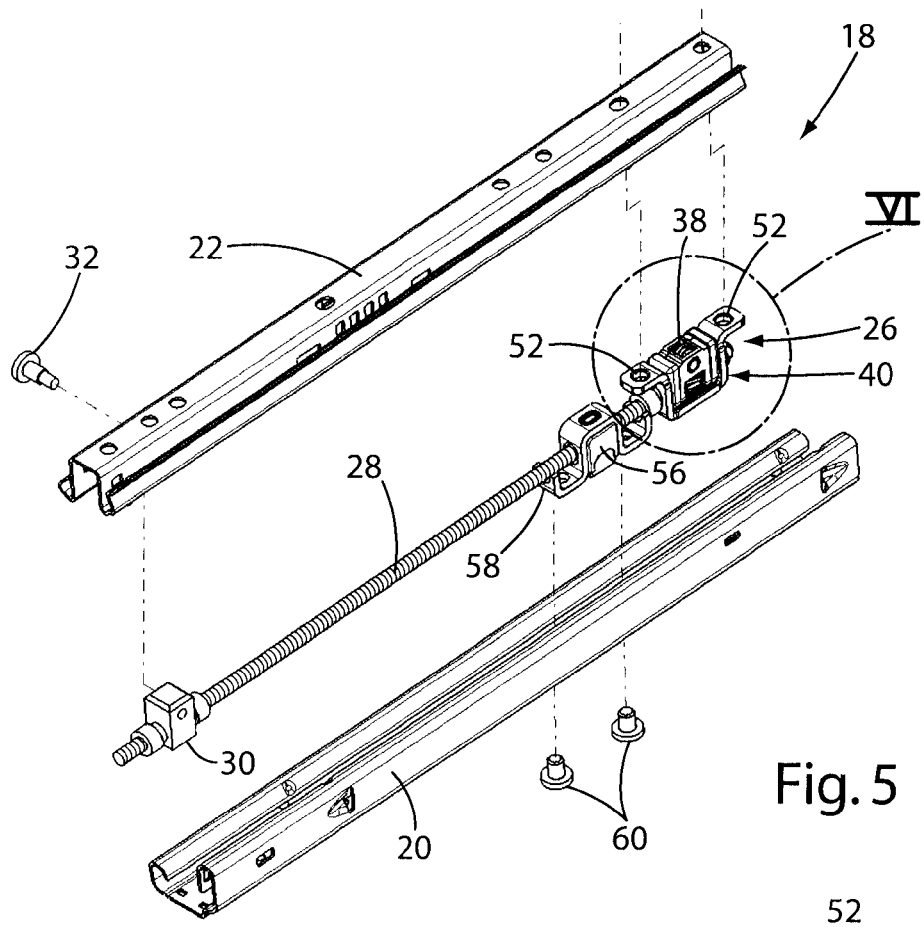
FIG. 5 is an exploded view of a portion of the motorized track system depicting the base and driven tracks, together with the lead screw and transmission assembly according to the subject invention.
Figure 6:
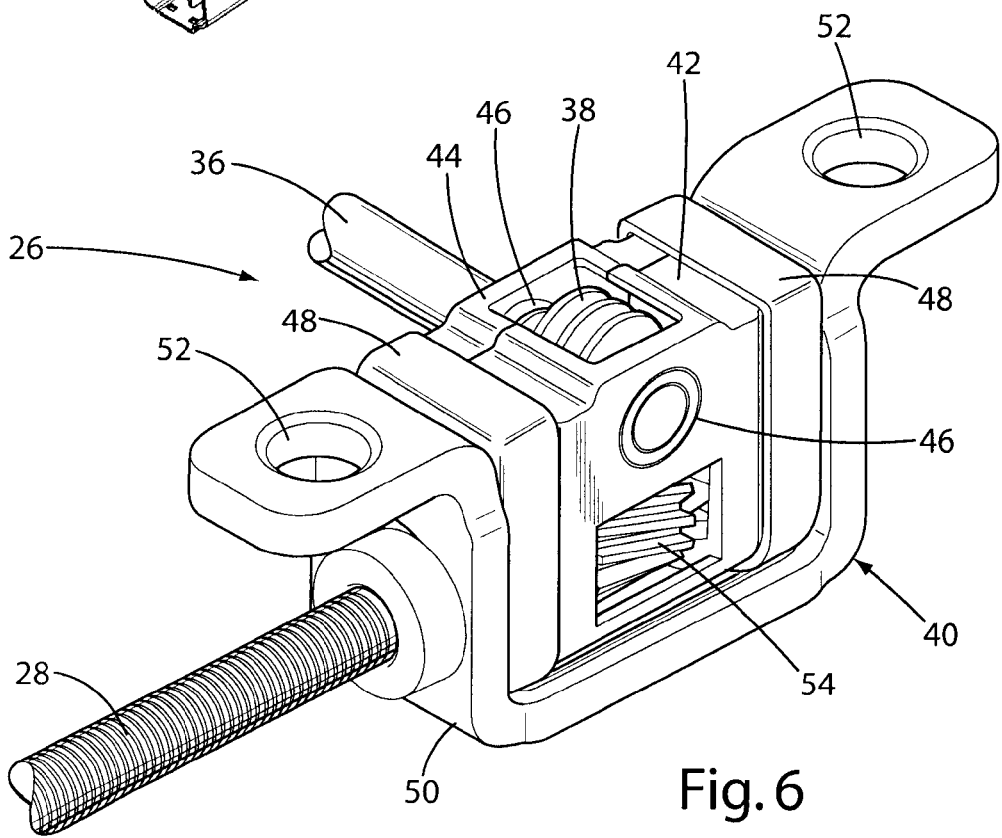
FIG. 6 is an enlarged view of the transmission assembly as circumscribed by broken lines in FIG. 5.

The transmission assembly 26 interacts with an externally threaded lead screw 28 to produce the desired longitudinal displacement. The particular method by which the transmission assembly 26 interacts with the lead screw 28 can be varied among different mechanically equivalent arrangements, two of which are depicted in the figures. More specifically, as shown in FIGS. 5 and 6, the transmission assembly 26 is longitudinally fixed relative to the lead screw 28 and translates, as a unit, therewith. However, in an alternative embodiment of the invention which will be described subsequently in connection with FIGS. 7-9, the transmission assembly 26' interacts with the lead screw 28' by traveling the length of the lead screw 28'. I.e., in this latter example, the transmission assembly 26' translates longitudinally relative to a stationary lead screw 28'.

Figure 3:
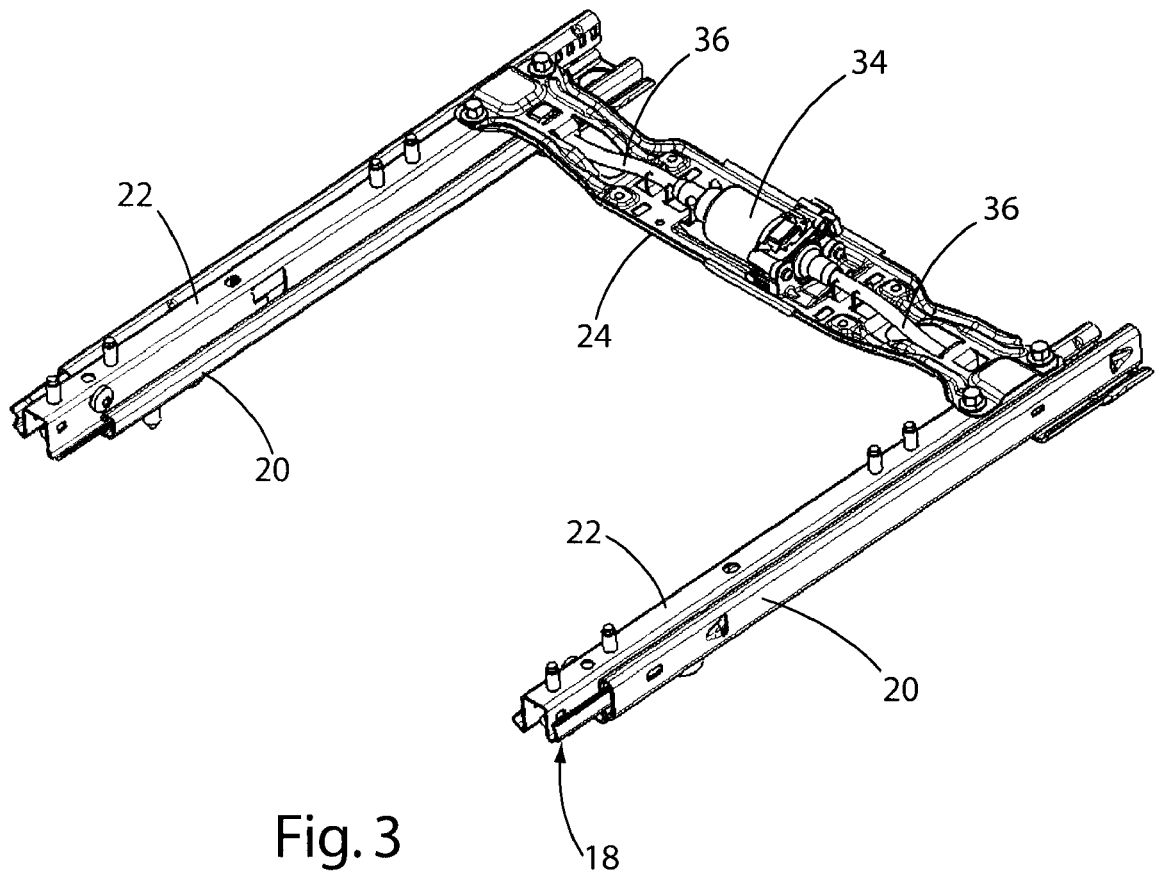
FIG. 3 is a prospective view of a motorized track system according to one embodiment of the subject invention.
Figure 4:
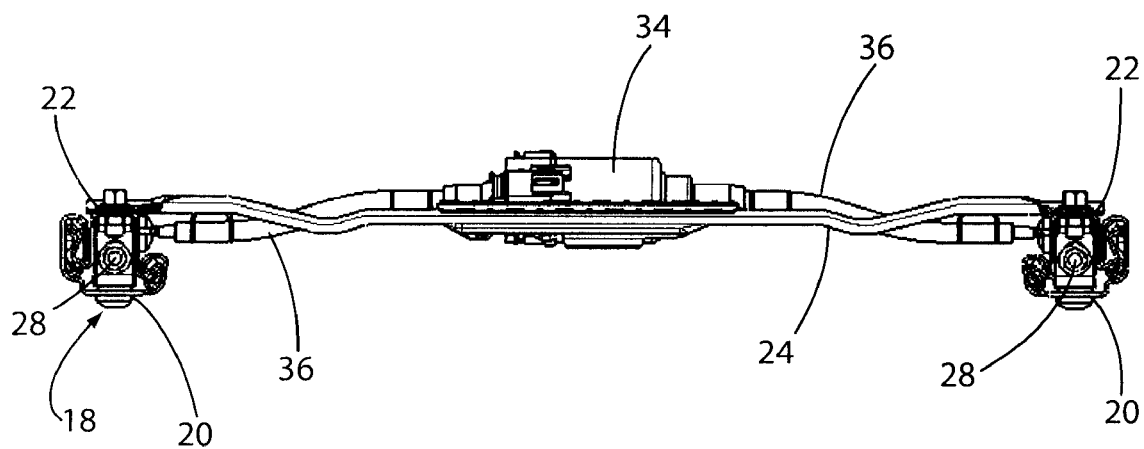
FIG. 4 is an end elevation view of the motorized track system of FIG. 3.

Referring specifically now the embodiment depicted in FIGS. 5 and 6, the lead screw 28 is rotatably supported at one end by a bearing block 30 which in turn is affixed to the driven rail 22 by a fastener 32. The other end of the lead screw 28 is coupled to the transmission assembly 26, which in turn is attached to the opposite end of the driven rail 22. The transmission assembly 26 receives a rotary input from an electric motor 34 as shown in FIGS. 2-4. The motor 34 is provided with flexible drive shafts 36 extending from opposite ends. Each drive shaft 36 couples to a worm gear 38 which is a component of the transmission assembly 26. Thus, as each drive shaft 36 is turned by the armature of the motor 34, the worm gear 38 is caused to spin. The transmission assembly 26 includes a housing, generally indicated at 40, that rotatably supports the worm gear 38 via a pair of left and right cover halves 42, 44 as depicted in FIG. 6. The cover halves 42, 44 may be made from a lubris polymeric material of the type known to possess inherent dry bearing qualities. Alternatively, bushings 46 may be interposed between the worm gear 38 and cover halves 42, 44 to provide a bearing function. Fasteners (not shown), heat staking, self-locking clips, or other methods may be used to securely join the cover halves 42, 44 together as an integral unit.

The left 42 and right 44 cover halves are surrounded at their longitudinally spaced ends by a pair of isolators 48 which serve primarily to dampen vibrations between the left 42 and right 44 cover halves and a rigid, preferably metallic, outer bracket 50. The isolators 48 may be manufactured from a rubber or highly resilient material. The bracket 50 has, in this embodiment, a generally U-shaped configuration with outwardly bent flanges containing mounting holes 52. According to the embodiment of this invention illustrated in FIGS. 5 and 6, the transmission assembly 26 is affixed to the driven rail 22 via fasteners (not shown) passing through the mounting holes 52 in the bracket 50.

The transmission assembly 26 further includes a drive nut 54 having external gear teeth in meshing contact with the threads of the worm gear 38. The drive nut 54 has a rotational axis which is generally transverse to the rotational axis of the worm gear 38. Like the worm gear 38, the drive nut 54 is also rotationally captured between the left 42 and right 44 cover halves of the housing 40. In this embodiment of the invention, the lead screw 28 is fixedly joined to the drive nut 54 such that they rotate in unison about a common axis. As a result, when the drive nut 54 is forcibly rotated through the interaction of the worm gear 38, the lead screw 28 turns within its bearing block 30.

Located along the length of the lead screw 28, between the transmission assembly 26 and the bearing block 30, a fixed nut 56 is threadably disposed on the lead screw 28. The fixed nut 56 is affixed relative to the base rail 20 by a mounting bracket 58 secured through fasteners 60. In this manner, the fixed nut 56 is stationary relative to the base rail 20. As the lead screw 28 is turned through operation of the transmission assembly 26, its screw threads interact with internal threads in the fixed nut 56, propelling the attached driven rail 22, transmission 26 and transverse rail 24 in a longitudinal direction relative to the length of the lead screw 28. By this means, the supported element, be it a seat 12, window or other, is advanced or retracted in a longitudinal direction, as powered by the motor 34.

Figure 7:
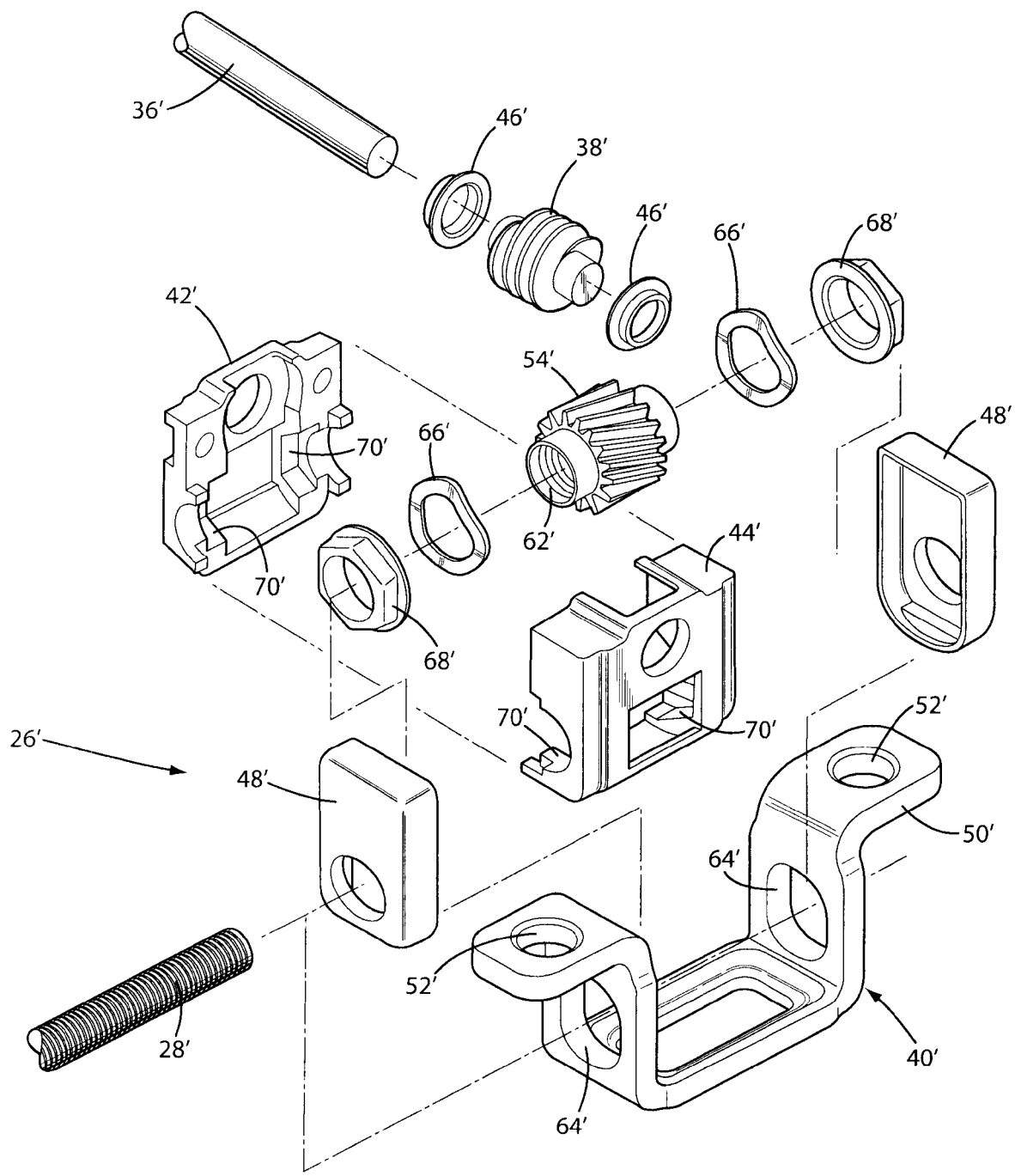
FIG. 7 is an exploded view of an alternative embodiment of the transmission assembly.
Figure 8:
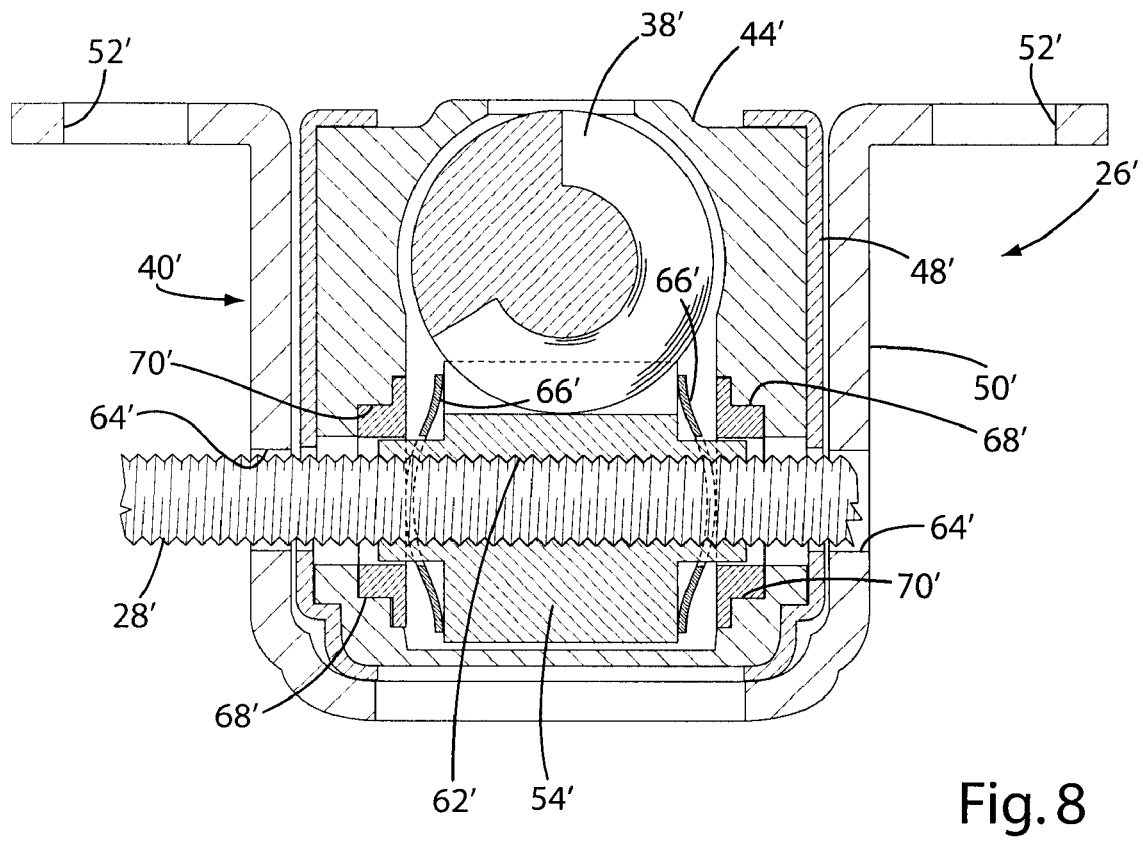
FIG. 8 is a partially sectioned view as taken longitudinally through the transmission assembly.
Figure 9:
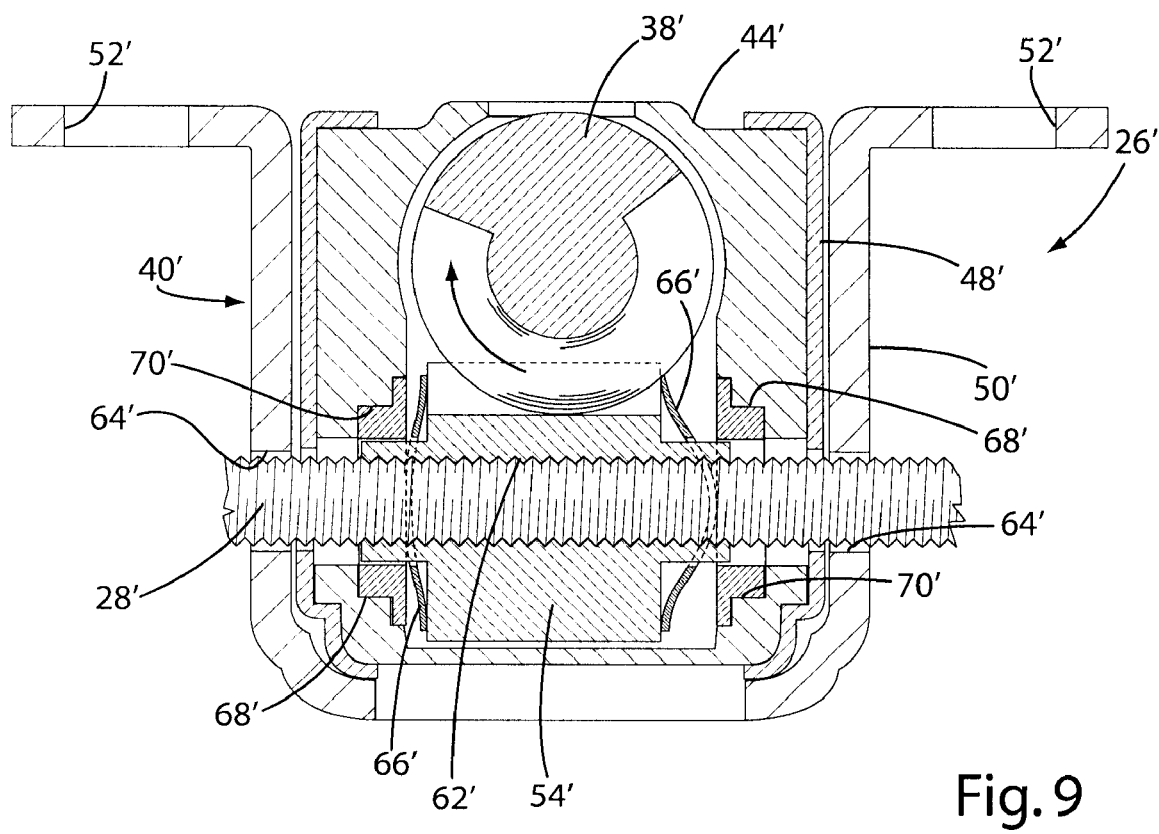
FIG. 9 is a view as in FIG. 8 but showing the compression washers deflected in response to reaction forces between drive nut and housing.

Turning now to FIGS. 7-9, an alternative yet mechanically equivalent construction of this transmission assembly 26' is depicted, wherein prime designations are used for convenience to distinguish between the two embodiments of this invention. In this example, the lead screw 28' is fixedly attached to the base rail (not shown) so that it does not rotate. In furthering this example, the drive nut 54' is provided with internal screw threads 62' that threadably interact with the outer turns of the lead screw 28'. The bracket 50' is provided with through holes 64' that allow the lead screw 28' to pass completely through the transmission assembly 26'.

When the drive nut 54' is turned by the worm gear 38', its internal threads 62' advance along the lead screw 28', in either longitudinal direction depending upon which way the drive nut 54' is rotated, and thereby propel the entire transmission assembly 26' in either longitudinal direction.

A particular issue arising from prior art designs of transmission assemblies used for such motorized track systems results from premature component wear particularly in the area of the drive nut 54, 54' between the cover halves 42, 44, 42', 44'. Similarly, noise of an objectionable level is created whenever the transmission assembly 26, 26' is activated from a rest condition. This is caused by the interaction between the threads of the worm gear 38 and the external teeth on the drive nut 54, which causes a reaction force in the drive nut 54 to move in either longitudinal direction, depending upon the turning direction of the worm gear 38, 38'. This reaction force is home internally in the housing 40, 40', and in particular on the interior components of the left 42, 42' and right 44, 44' cover halves. The subject invention overcomes this objectionable wear and noise phenomenon by inserting at least one, and preferably two compressible washers 66' as shown in FIGS. 7-9. It will be understood, however, that the embodiment of the invention depicted in FIGS. 5-6 includes corresponding features, although they are not visible from the illustrations. The one, or two, compressible washers 66' are disposed between either one or both ends of the drive nut 54' and first and second bushings 68' which are disposed on opposite, longitudinally spaced sides of the drive nut 54' for bearing axial loads between the drive nut 54' and the housing 40'. The first and second bushings 68' may include an anti-rotation feature which interacts with the left 42 and right 44 cover halves. In this example, the anti-rotation feature is depicted as hex flats which engage complimentary hex pockets 70 in the left 42 and right 44 cover halves. Other anti-rotation techniques may be used instead of a hex.

FIG. 8 illustrates a simplified cross-sectional view through the transmission assembly 26', and depicting the compressible washers 66' in a balanced, static condition. This is typical of the transmission assembly 26' at rest. By comparison to FIG. 9, however, when the worm gear 38' begins to turn, as suggested by the clockwise directional arrow, reaction forces between the meshing threads and gear teeth urge the drive nut 54' to press against the left side of the cover halves 42', 44', as viewed from FIG. 9. The compressible washers 66' react by harmoniously compressing and/or expanding to accommodate the shift. The result is a dampening effect which produces very little noise and prevents the drive nut 54' from bearing harshly against either of the bushings 68'. Although two compressible washers 66' are illustrated in FIGS. 8 and 9, those of skill in the art will appreciate that similar functionality can be accomplished with but a single compressible washer 66' disposed on either side of the drive nut 54'.

Preferably, the compressible washer 66' is of the so-called wave washer type manufactured from a spring steel material. While preferred, however, this is not the only construction for the compressible washer 66' which will produce acceptable results. Other compressible washer designs may be substituted with similar effectiveness, including compressible foam designs, coil spring designs, and the like.

Accordingly, a transmission assembly 26, 26' manufactured according to the disclosed construction, wherein a compressible washer 66, 66' or washers is shown to improve functionality, extend service life and reduce objectionable noises in the operation of a track system 18.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A transmission assembly for a motorized track system used to adjust the position of a supported element by interaction with an elongated lead screw, said assembly comprising:
    a worm gear supported for rotation;
    a drive nut having external gear teeth in meshing contact with said worm gear, said drive nut operatively engaged with the lead screw and being longitudinally displaceable in response to rotation induced by said worm gear;
    a housing generally surrounding said drive nut and said worm gear, said housing including a mounting bracket for attaching to the supported element to translate the supported element together with said drive nut longitudinally relative to the length of the lead screw; and
    a compressible washer disposed between said drive nut and said housing.

2. The transmission assembly of claim 1 wherein said compressible washer comprises a wave washer.

3. The transmission assembly of claim 1 wherein said housing includes first and second bushings disposed on opposite, longitudinally-spaced sides of said drive nut for bearing axial loads between said drive nut and said housing, said compressible washer disposed between at least one of said first and second bushings and said drive nut.

4. The transmission assembly of claim 3 wherein said housing includes a pair of left and right cover halves disposed on opposite lateral sides of said drive nut and capturing said first and second bushings there between.

5. The transmission assembly of claim 4 wherein said housing includes a pair of isolators adjoining longitudinally-spaced ends of said left and right cover halves, said isolators directly abutting said mounting bracket.

6. The transmission assembly of claim 4 wherein said compressible washer comprises a metallic wave washer.

7. The transmission assembly of claim 6 wherein said worm gear is rotatably supported in said left and right cover halves of said housing for rotation about an axis skewed relative to the longitudinal direction.

8. The transmission assembly of claim 7 further including a motor having an output shaft operatively connected to said worm gear.

9. A motorized track system of the type used to adjust the position of a supported element, said track system comprising:
    a base rail;

an externally threaded lead screw establishing a longitudinal direction along which a supported element is moved back and forth to change its longitudinal position;

a driven rail interactive with said base rail for longitudinal sliding movement there between;

a transmission assembly interactive with said lead screw;

said transmission assembly including a worm gear and a drive nut having external gear teeth in meshing contact with said worm gear, said drive nut operatively engaged with said lead screw;

a housing generally surrounding said drive nut and said worm gear, said housing including a mounting bracket for attaching to the supported element to translate the supported element together with said drive nut and said driven rail longitudinally relative to the length of said lead screw; and a compressible washer disposed between said drive nut and said housing.

10. The track system of claim 9 wherein said compressible washer comprises a wave washer.

11. The track system of claim 9 wherein said housing includes first and second bushings disposed on opposite, longitudinally-spaced sides of said drive nut for bearing axial loads between said drive nut and said housing, said compressible washer disposed between at least one of said first and second bushings and said drive nut.

12. The track system of claim 11 wherein said housing includes a pair of left and right cover halves disposed on opposite lateral sides of said drive nut and capturing said first and second bushings there between.

13. The track system of claim 12 wherein said housing includes a pair of isolators adjoining longitudinally spaced ends of said left and right cover halves, said isolators directly abutting said mounting bracket.

14. The track system of claim 12 wherein said compressible washer comprises a metallic wave washer.

15. The track system of claim 14 wherein said worm gear is supported in said left and right cover halves of said housing for rotation about an axis generally perpendicular to the longitudinal direction.

16. The track system of claim 15 further including a motor having an output shaft operatively connected to said worm gear.

17. A method for eliminating play between a drive nut mounted in a transmission for use in a motorized track system having a lead screw, the transmission including a housing and a worm gear, said method comprising the steps of:

locating first and second bushing on opposite sides of the drive nut;

placing a wave washer between at least one of the first and second bushings in the drive nut;

capturing the drive nut, worm gear, first and second bushings and wave washer in a translatable housing so that the wave washer is partially compressed in response to rotation of the drive nut.

18. The method of claim 17 further including the step of configuring the first and second bushing to prevent rotation of the bushings relative to the housing.

19. The method of claim 17 further including the step of manufacturing the wave washer from a spring steel material.

20. The method of claim 17 further including the step of manufacturing the wave washer from a compliant non-metallic material.

* * * * *